Patented May 17, 1949

2,470,361

UNITED STATES PATENT OFFICE 2,470,361

ART OF RECLAIMING PLASTIC SCRAP

Isador Miller, New York, and Arthur L. Beiser, Jackson Heights, N. Y., assignors to Gem Participations, Inc., New York, N. Y., a corporation of New York No Drawing. Application June 27, 1945, Serial No. 601,940

4 Claims. (Cl. 260—486)

1

The present invention relates to the reprocessing of plastic scrap produced from sheeting, coating, adhesive, injection molding compound or casting resin, more especially where the plastic scrap is of type derived from monomers containing the vinyl group, for the purpose of recovering therefrom monomer that has substantially the same characteristics and utility as that from which the plastic was originally prepared.

While the invention has an important application to the reprocessing of synthetic resins that are thermoplastic only in a limited sense, such as methyl methacrylate ("Lucite") scrap, particularly such scrap derived from casting or machining, it lends itself also to the recovery of monomers from thermoplastic polymer, i. e., vinyl derivatives generally, such as vinyl acetate, vinyl chloride, vinyl benzene (styrene), vinylidene chloride, acrylates and methacrylates generally, as well as to vinyl copolymers, such for instance, as copolymers of vinyl acetate and vinyl chloride, butacite (vinyl butyraldehyde derivative) and mixed methacrylate butacite scrap, all of which are derived from monomers containing the vinyl group and may be considered as derivatives thereof.

It is among the objects of the invention to provide a decomposition process for expeditiously and efficiently depolymerizing scrap of the character noted, that is, heterogeneous mixtures of basically identical compounds of different molecular weights for a large yield of pure water white monomer and the recovery of valuable plasticisers from the residues, which process is easy to control, simple to operate and inherently avoids the tendency to repolymerize the monomer in the final step of isolating and purifying the same.

The process involves generally pyrolysis, that is, decomposition by the application of heat to the scrap while immersed in a liquid internal heat transfer medium that is itself volatile without decomposition. The pyrolysis is preferably conducted under reduced pressure and at temperatures considerably lower than that required where solid inert heat transfer media, such as sand or molten metal, are used. Indeed, by the present invention much of the heating is effected at temperatures substantially below the temperature of decomposition of the polymer mass.

The liquid internal heat transfer medium is stable, that is, of character to volatilize without decomposition under the temperature and pressure conditions of the process. It also has the property of wetting the scrap and is of specific gravity lower than that of the scrap being treated, so that the heat transfer medium readily and easily carries the heat uniformly to all portions of the scrap under treatment.

The liquid internal heat transfer medium has a boiling point much higher than that of the monomer to be recovered as the end product. The composition of the vapors will depend on the boiling range of the heat transfer medium, as well as the proportion of monomer present therein at any given instant. As a general rule, the heat transfer medium will form the larger portion of the vapor phase. While the heat transfer medium need not have a solvent action either upon the polymer or upon its various products of depolymerization, it is within the scope of the invention to use a heat transfer liquid which has a solvent action on some or all of such products.

Examples of heat transfer liquid that have but little solvent action upon the polymer scrap but have a substantial solvent action on some of its depolymerization products, are dimethyl maleate and dibutyl phthalate, or mixtures of the two.

Since the boiling point of dibutyl phthalate, for example, in the preferred pressure range indicated below is lower than the temperatures required for the most refractory polymers, it is obvious that dibutyl phthalate alone can be used only for polymers decomposable in that range.

A preferred heat transfer medium that has a substantial solvent action both upon the scrap and upon its various depolymerization products is a liquid consisting of the crude complex of low molecular weight compounds derived from the scrap itself and recovered as a residue in the purification of monomer by fractional distillation at atmospheric pressure. In a preferred embodiment of the present invention, we use the crude complex recovered as residue in the purification of methyl methacrylate monomer.

Any non-reactive plasticiser originally present in the polymer scrap under treatment will, of course, be recovered as such during the heat treatment and will remain as a constituent of the crude complex recovered as residue after purification of the monomer. We have also found that this residue will contain substances not originally present in the polymer, and which apparently are products of the pyrolysis. For example, we have identified dimethyl maleate as a product of decomposition of methyl methacrylate polymer.

The scrap being treated should be of weight approximately equal to the weight of the heat transfer medium at the beginning and as the pyrolysis proceeds, the amount of material functioning as heat transfer medium increases because it is one of the products of reaction.

The heat transfer medium chosen in any given instance will depend on its properties in relation to the polymer to be treated. It must be liquid, stable, scrap wetting and volatile without decomposition. Its specific gravity must be equal to or less than that of the scrap. It must boil at temperatures equal to or higher than the operating temperatures at the given pressures.

We have discovered that the use of the complex set forth avoids objectionable discoloration of the monomer yield. The color bodies commonly carried over with the monomer vapor are either retained by or destroyed in the crude complex remaining as still residue in the subsequent purification and recovery of the monomer by fractional distillation at atmospheric pressure. No color adsorbents or bleaching or other chemical purifying agents are required.

We have also discovered that said complex in small amounts act as a polymerization inhibitor and when present to the extent of substantially more than ten per cent acts as a polymerization preventative. Since the complex as noted, is always present in the still in percentage several times ten (10%) per cent, polymerization during purification is effectively and completely avoided. No foreign solid polymerization inhibitor such as hydroquinone is required with its objectionable tendency to sublime and discolor the monomer during distillation.

Bearing in mind that the polymerized product to be processed is not a chemical entity of definite composition but a heterogeneous mixture of compounds of different molecular weights but basically identical structure, there is no one temperature of decomposition, but in general decomposition or depolymerization is progressive. Apparently compounds of a given degree of polymerization are decomposed more readily, that is, under less severe conditions of heat and pressure than compounds of other degrees of polymerization. Therefore, it is preferred in operation, progressively to increase the temperature or progressively to reduce the pressure or both, so as to depolymerize the more reactive polymer molecules at temperature well below the decomposition temperature of the mass, and progressively to depolymerize the more refractory polymer molecules as the intensity of operation (increase of temperature, decrease of pressure) is enhanced. The most refractory of the molecules require a temperature well above the temperature of decomposition of the polymer mass as such. Of course, the temperature could be limited, if desired, to any maximum short of complete pyrolysis of the polymer mass, with correspondingly reduced yield.

In the treatment, for instance, of methyl methacrylate scrap of the general type known as "Lucite" in our preferred heat transfer bath, although the reaction starts at even lower temperature, a practical rate of decomposition is obtained at a temperature of 200 degrees C. which is well below the temperature of decomposition of the scrap as such, under a pressure not exceeding 45 to 50 mm., although if desired, that pressure may be as high as 75 mm. if the temperature is increased somewhat, say to 225 degrees C. As depolymerization progresses, the temperature is raised progressively and if desired or convenient, the pressure may be lowered concomitantly. Such lowering of pressure is a convenient way of controlling the temperature and avoiding objectionable overheating. The maximum temperature to which the scrap is raised is 50 degrees C. but preferably that temperature should not be permitted to rise above 340 degrees C. The operating pressures in the course of operation should never exceed 120 mm. but may become as low as 10 mm. with a range of 50 to 25 mm. as the practical optimum. Within the range specified, about one-half of the scrap will be decomposed below 300 degrees C. and the remainder above.

The vapor derived from the process is condensed in a suitably chilled condenser and the pure monomer may be recovered from the condensate by fractional distillation at atmospheric pressure. As above indicated, the still residue from this purification ordinarily consists of a mixture of the added heat transfer medium, any plasticizer (as dibutyl phthalate and the like) originally present in the scrap and the crude complex of low molecular compounds resulting from the pyrolysis by molecular re-arrangement.

A specific example of the foregoing process as applied to the depolymerization of a typical batch of methyl methacrylate scrap is the following: 600 parts of clean methyl methacrylate ("Lucite") scrap and 600 parts of the crude low molecular complex above referred to, are heated at 48 to 50 mm. pressure in the range progressively rising from 200 to 340 degrees C. The distillation condensed at $-5°$ to $-10°$ C. are collected at various temperatures as follows:

|  | Parts |
|---|---|
| To 200° C | 158 |
| 201° to 250° C | 132 |
| 251° to 300° C | 220 |
| 301° to 340° C | 623 |
|  | 1133 |

On purification by fractional distillation at atmospheric pressure, 375 parts of pure water-white methyl methacrylate monomer are recovered.

The still residue (758 grams) will contain approximately 40–42 grams of monomer which can be re-treated in a subsequent batch. Taking into consideration the 600 grams heat transfer medium originally added, about 110–120 grams crude residues will be obtained. In addition to approximately 25–30 grams of dibutyl phthalate apparently originally present as plasticizer, about 80 grams residue are obtained as a result of the pyrolysis.

It will be apparent that the operation could be conducted in a batch or in a continuous process. In the latter procedure, suitable provision is made for fractionation of the vapors and refluxing back a definite proportion of the condensed and separated heat transfer medium, as fresh scrap is added in proportion.

Where the depolymerization products are predominantly gaseous at ordinary temperatures and pressures, as for example in the case of certain vinyl copolymers, provision is made for collecting the products at suitable low temperatures and, if necessary, modified pressures.

It will of course be understood by those skilled in the art, that optimum conditions of temperature and pressure will vary with the chemical nature of the polymer being treated and the depolymerization products to be derived.

Having thus described our invention, what we claim as new and desire to secure by Letters Patent of the United States is:

1. Process for utilizing polymer scrap derived from monomer containing the vinyl group which consists in decomposing the scrap by pyrolysis at subatmospheric pressures, and progressively increasing temperatures with said scrap immersed in a stable volatile liquid solvent internal heat transfer medium comprising a crude complex of low molecular weight compounds of specific gravity lower than that of the scrap and which is recovered as a residue in the purification of monomers by the fractional distillation of the products of pyrolytic decomposition of such polymer scrap.

2. In the process for utilizing methyl methacrylate scrap the step of subjecting the scrap to pyrolysis while immersed in a stable volatile liquid solvent internal heat transfer medium, comprising a crude complex of low molecular weight compounds of specific gravity lower than that of the scrap and which is recovered as a residue in the purification of monomers by the fractional distillaiton of the products of pyrolytic decomposition of such polymer scrap, first at temperatures below the decomposition temperature of the scrap as such, and thereafter at progressively higher temperatures, all under reduced pressure in the range of 120 mm. to 10 mm.

3. In the process of utilizing methyl methacrylate scrap, the pyrolysis thereof while immersed in a stable volatile liquid solvent internal heat transfer medium consisting essentially of a crude complex of low molecular weight compounds of specific gravity lower than that of the scrap and which is recovered as a residue in the purification of monomers by the fractional distillation of the products of pyrolytic decomposition of such polymer scrap, said pyrolysis being conducted at an elevated temperature progressively rising in the range between 200 degrees and 350 degrees C. and at reduced pressure in the range of 120 mm. to 10 mm.

4. In the process of utilizing methyl methacrylate scrap, the pyrolysis thereof while immersed in a stable volatile liquid solvent internal heat transfer medium consisting essentially of a crude complex of low molecular weight compounds of specific gravity lower than that of the scrap and which is recovered as a residue in the purification of monomers by the fractional distillation of the products of pyrolytic decomposition of such polymer scrap, said pyrolysis being conducted at an elevated temperature in the range between 200 degrees and 340 degrees C. and at reduced pressure in the range of 50 mm. to 25 mm.

ISADOR MILLER.
ARTHUR L. BEISER.

REFERENCES CITED

The following references are of record in the file of this patent:

UNITED STATES PATENTS

| Number | Name | Date |
|---|---|---|
| 2,030,901 | Strain | Feb. 18, 1936 |
| 2,248,512 | Philip et al. | July 8, 1941 |
| 2,341,282 | Marks | Feb. 8, 1944 |
| 2,359,212 | Frank et al. | Sept. 26, 1944 |
| 2,383,921 | Soday | Aug. 28, 1945 |